(12) United States Patent
Deeley

(10) Patent No.: US 9,324,108 B2
(45) Date of Patent: Apr. 26, 2016

(54) CONTROL METHOD, SYSTEM AND DEVICE

(71) Applicant: Dunraven Finance Limited, Bridgend (GB)

(72) Inventor: Andrew Deeley, Kent (GB)

(73) Assignee: Dunraven Finance Limited, Bridgend (GB)

( * ) Notice: Subject to any disclaimer, the term of this patent is extended or adjusted under 35 U.S.C. 154(b) by 0 days.

(21) Appl. No.: 14/370,770

(22) PCT Filed: Jan. 24, 2013

(86) PCT No.: PCT/GB2013/050144
§ 371 (c)(1),
(2) Date: Jul. 4, 2014

(87) PCT Pub. No.: WO2013/110934
PCT Pub. Date: Aug. 1, 2013

(65) Prior Publication Data
US 2014/0366100 A1    Dec. 11, 2014

(30) Foreign Application Priority Data

Jan. 27, 2012 (GB) .................................. 1201372.8

(51) Int. Cl.
*H04L 29/06* (2006.01)
*G06Q 30/06* (2012.01)
*G06F 21/44* (2013.01)
*G06Q 20/14* (2012.01)
*G07C 5/08* (2006.01)

(52) U.S. Cl.
CPC ............. *G06Q 30/0645* (2013.01); *G06F 21/44* (2013.01); *G06Q 20/14* (2013.01); *H04L 63/08* (2013.01); *G07C 5/085* (2013.01)

(58) Field of Classification Search
CPC .... G06Q 30/0645; G06Q 20/14; G06F 21/44; G07C 5/085; H04L 63/08
USPC ............................................................. 726/4
See application file for complete search history.

(56) References Cited

U.S. PATENT DOCUMENTS

| 4,700,296 | A | 10/1987 | Palmer, Jr. et al. |
| 6,047,258 | A | 4/2000 | Allison et al. |
| 7,285,872 | B2 * | 10/2007 | Ellingsworth et al. ....... 307/10.3 |
| 7,518,489 | B2 * | 4/2009 | Nelson et al. ............. 340/426.11 |

(Continued)

FOREIGN PATENT DOCUMENTS

| JP | 2000105621 A | 4/2000 |
| JP | 2002168515 A | 6/2002 |
| JP | 2007184783 A | 7/2007 |

OTHER PUBLICATIONS

"PC Rental Agent—Protect Your RTO Computers"—Jan. 11, 2010, See http://web.archive.org/web/20100111032608/http://www.pcrentalagent.com/eSiteWay/Home.aspx?.

(Continued)

*Primary Examiner* — Michael S McNally
(74) *Attorney, Agent, or Firm* — Winstead PC

(57) ABSTRACT

A computer-implemented control method for a rented device, comprises providing identification data to identify the device at a server, receiving a permission data file for the device from the server on the basis of the identification data, and including data representing a set of operating permissions associated with the device, executing a device specific operation on the basis of the permission data file to restrict or enable a function of the device.

6 Claims, 3 Drawing Sheets

(56) References Cited

U.S. PATENT DOCUMENTS

| | | | |
|---|---|---|---|
| 9,026,267 B2* | 5/2015 | Schwarz et al. | 701/2 |
| 2001/0040503 A1* | 11/2001 | Bishop | 340/426 |
| 2003/0033601 A1 | 2/2003 | Sakata et al. | |
| 2006/0026022 A1* | 2/2006 | Cooley et al. | 705/1 |
| 2007/0061860 A1* | 3/2007 | Walker et al. | 725/117 |
| 2008/0147555 A1 | 6/2008 | Cromer et al. | |
| 2011/0022620 A1* | 1/2011 | Woods | 707/769 |
| 2011/0313938 A1* | 12/2011 | Dicke et al. | 705/310 |

OTHER PUBLICATIONS

International Search Report, mailed May 7, 2013; Authorized Officer: Falo, Luca.

* cited by examiner

CONTROL METHOD, SYSTEM AND DEVICE

BACKGROUND

Renting or renting with an option to own (known as hire purchase or rent-to-own in some parts of the world) high-ticket price products can be the only way that many lower income and credit-constrained households around the world can obtain products that they need or desire. Typically, rental companies and companies that provide specialist credit and hire purchase facilities to consumers to obtain products have many disjointed systems, some automated, some not to manage their customer repayments. A risk associated with renting products is the potential bad debts that companies will experience due to the write off of goods as a result of people absconding or refusing to pay for the goods.

SUMMARY

According to an example, there is provided a secure hardware and software platform to limit the risk of bad debts relating to rented equipment by providing companies the means to control the payment behavior of their customers using a real time pay as you use system. The system allows the customer use of the product in question assuming that payments have been made, can track the product if a customer absconds with the product and can limit the functions of the product in situations where a customer is unable to make a full payment or when the customers payment falls into arrears but they make an acceptable commitment to make a payment at some point in the future for example.

A platform according to an example provides an end-to-end solution between the electronic, electrical or powered product in a customers possession, the payment systems used to collect payment from the customer and the control system to manage the product permissions which will unlock, limit or lock the product in question or put a trace on the product should the customer abscond with the product for example.

According to an example, there is provided a computer-implemented control method for a rented device, comprising providing identification data to identify the device at a server, receiving a permission data file for the device from the server on the basis of the identification data, and including data representing a set of operating permissions associated with the device, executing a device specific operation on the basis of the permission data file to restrict or enable a function of the device. The permission data file can be validated in order to ascertain its authenticity. The device can display static and moving images, and an electronic program guide for the device can be controlled.

According to an example, there is provided a control system for a rented device, comprising a control platform unit to provide permission data representing multiple operating permissions associated with the device, a permission control unit of the device to use the permission data to execute a device specific operation to restrict or enable a function of the device. The permission control unit can be a standalone device to connect to the device and restrict a function of the device upon its removal from the device. The permission control unit can be embedded into a firmware module of the device. The permission control unit can be a cloud based module operable to communicatively couple with the device.

According to an example, there is provided a device which is suitable for use with the control system or operable in accordance with the method as described herein.

BRIEF DESCRIPTION OF THE DRAWINGS

An embodiment of the invention will now be described, by way of example only, and with reference to the accompanying drawings, in which.

DETAILED DESCRIPTION

Typically when renting or providing cash and credit-constrained consumers with credit facilities to obtain products, companies can charge higher rental or interest rates to account for higher levels of risk. In an example, products and equipment fitted with a Permission Control Unit (PCU) can be offered to a consumer at a cheaper rate, which in turn makes them more affordable to those that are cash and credit constrained. For example, by reducing the risk, companies can afford to reduce the cost of providing credit as well as tie up less cash in bad debt provisions, giving them more capital to provide more customers access to products.

Figure 1:
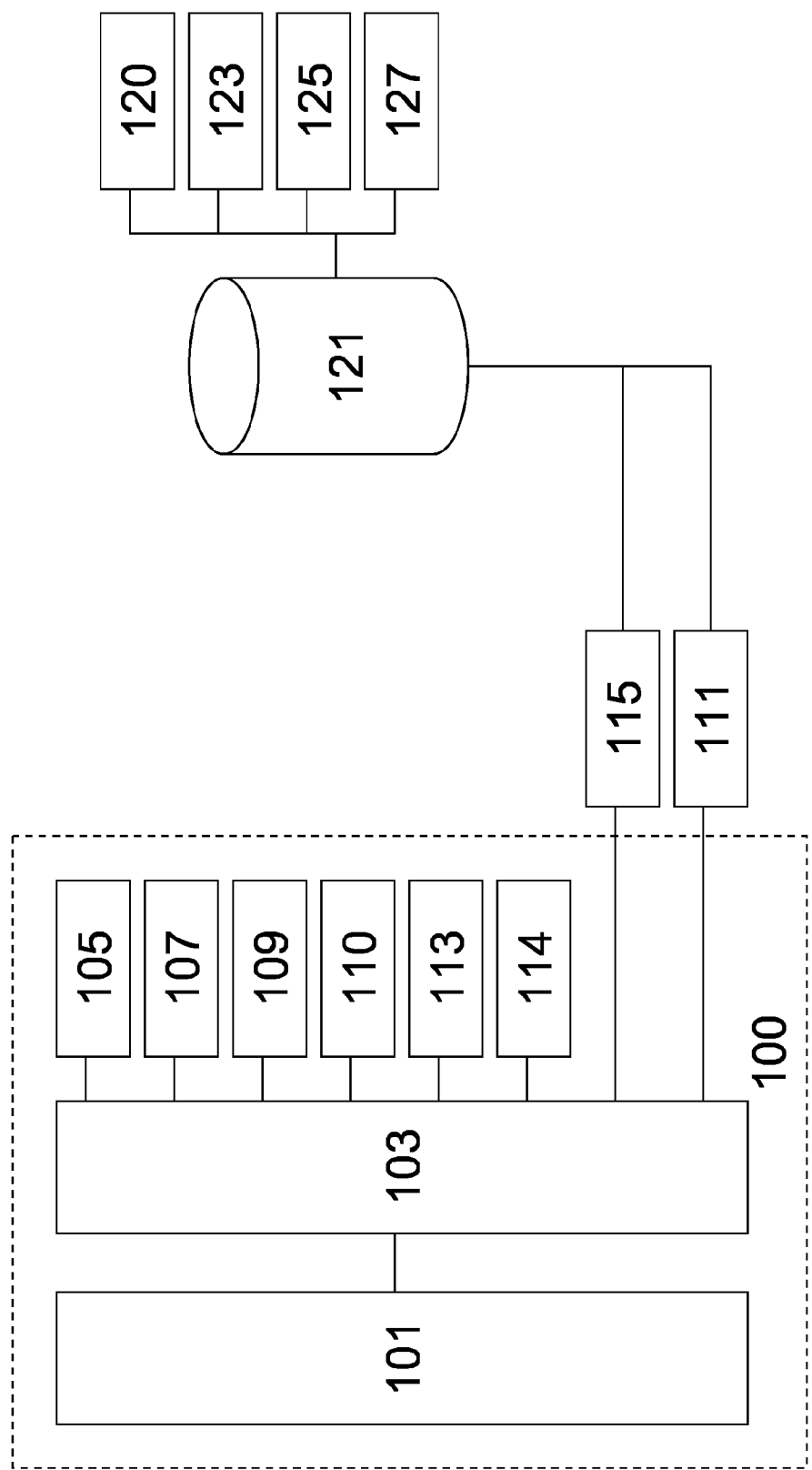
FIG. 1 is a schematic block diagram of a system according to an example.

A system according to an example can be used with any electronic device, electrical appliance or piece of powered equipment that may be rented or purchased on a hire-purchase or credit loan agreement. Referring to FIG. 1, a control platform (Rental and Hire Purchase Control Platform—RHPC) including an RHPC Unit 121 is used to register a device as part of an installation process. A device 100 according to an example will have incorporated one of multiple types of Permission Control Unit (PCU) 103 installed. A PCU 103 can access the Internet. A PCU 103 which can use a telecommunications network such as GPRS for example can be used where an Internet connection is not available. The device connects to the RHPC unit 121 via one of the types of PCU 103.

A device registration process can be effected by either entering a code onto the product being installed or by scanning a barcode or entering a unique asset number found on label attached to the device for example. A scanner or similar device can be used to receive the barcode or asset number and can synchronize, using an Internet or GPRS connection for example, the registration details for the customer and the PCU 103 to an RHPC Unit 121.

According to an example, each product has a unique PCU ID that can be used to associate it with a unique customer identification number. This code can be the MAC address of the device in question for example, but if this is not available each PCU 103 can be programmable with a unique identification number used to associate the product with the correct customer ID number. Details of the device registration can be confirmed on a device used to receive an asset number, and where possible on the product itself if it has the means to display a message, prior to the installation being completed.

The PCU 103 receives Permission Files from the RHPC Unit 121 which include for example, instructions that the PCU 103 can process, details of next payment date, payment amount due and current arrears amount and a history of payment amounts, payment dates and payment methods and a unique Permission File ID. In an example, data can be received by a PCU 103 over a direct interface using web services. Security measures can be incorporated into a PCU 103 to help prevent unauthorised access. In an example, upon very first install or following a complete system reboot, a PCU 103 can connect to the RHPC and request a secure RHPC password. This password is stored in the Permission Control Units keychain. The Permission control unit, before carrying out any instructions from the RHPC relating to changing any permissions can connect to the RHPC, pass it the password and authenticate that the instructions or Permission File are indeed valid. In an example, the password will have an expiry date and the Permission Control Unit can request a new password or be instructed by the RHPC unit to receive a new password to store in its keychain. A hidden IP address that the PCU 103 can interrogate at random and which the RHPC can change from time to time can be used so that the PCU 103 can bypass attempts to lock out calls to known IP addresses on a consumer's router.

Typically, the RHPC can throw out exceptions if a PCU 103 has not connected to the RHPC server. It will attempt to connect to the PCU 103 and if successful it will give a new IP address for the PCU 103 to try and cycle through a number of IP addresses in attempt to bypass any local IP address barring that may have been put in place.

Whilst different products will have different features, the PCU 103 can be configured to work in multiple environments thereby making it possible for companies who specialise in renting or selling products on hire purchase and loan agreements to substantially remove risk associated with renting a product or giving a line of credit to consumers to acquire the products.

Various parts of a system according to an example will now be described in more detail.

RHPC Unit

According to an example, an RHPC unit 121 can be a server, which can be cloud based. The RHPC unit 121 manages the interfaces between a device PCU 103 and other units that handle branding requirements, product alerts, payments, arrears, PCU 103 and consumer password control and product control and so on. In an example, an RHPC Unit 121 can store data representing details for:

Customer records
Products and devices with the customer
PCU ID
Current version of PCU in use
MAC Address of the product
IP Address of the customer
Current permissions
Permissions File
Permissions history
Brand requirements for the product user interface
Contact details and preferred method of contact
Passwords
PCU A PCU 103 can take multiple forms in an example. Typically, a PCU 103 can be incorporated into a device by including the PCU's operating system within a firmware or middleware of the device in question. This can be achieved by either integrating into the chip that holds the device's firmware/operating system or by providing a secondary chip with the PCU's operating system that interfaces with the device's own onboard firmware/operating system. This is referred to as a PCU 103 Type 1 herein.

A PCU 103 can also be part of a control module that contains a processor that holds the PCU's operating system. This is referred to as PCU 103 Type 2 herein. In an example, type 2 can operate by interfacing with an Internet connection of a device or, if this is not possible if the product does not have an Internet connection, an Internet communication unit 113, GPRS or GPS Communication Unit which can be attached to the PCU 103 for example.

In an example, a PCU 103 can be in the form of an add-on piece of hardware for a device 100. For example, the PCU and its components can be in the form of a device which can be plugged into a suitable port of a device 100. This could be via a USB type connector or any other type of suitable connector. The PCU and the device 100 can be configured such that the device ceases operation when the add-on PCU is removed from the device 100.

Alternatively, a PCU and associated components can be cloud based and operate to control functions of a device 100 over an internet connection, however this internet connection is provided.

The PCU could also sit inside the operating system of a micro PC that has been installed inside a device. An example might be a TV fitted with a separate micro PC, or similar. In this instance a PCU 103 may be installed within the firmware of that device and used to control aspects of the TV it is fitted to and display messages on screen and receive inputs from the customer for example.

Each type of PCU 103 will typically have two Operation Modes: Retail mode and Rental mode. In an example, a software switch which can be held in memory of the device is used to define which mode a PCU 103 operates in. In a 'Retail' mode of operation, the PCU 103 lies dormant only connecting to the RHPC unit to confirm that it should remain running in 'Retail' mode. If when confirming whether to stay in 'Retail' mode the RHPC Unit 121 gives the PCU 103 an instruction to switch to 'Rental' mode the PCU 103 can then set its internal software switch to 'Rental' and connect to the RHPC Unit 121 to acquire its Permission File.

The Permissions Control Units operation mode can be defaulted at time of manufacturer to either 'Retail' or 'Rental' depending upon the intended client that the product is being made for.

Steps are taken to ensure that this software switch cannot be circumvented by electronic engineers, who to carry out repairs to a product and who may have access to tools that can reprogram the products firmware. In an example, an engineer can reprogram a product's firmware by attaching a hardware device, via a cable, or in some instances via an internet connection. If a version of the firmware existed that did not have the retail/rental switch then it would be possible to reprogram the firmware and remove the rental/retail switch feature. To protect from this, the rental/retail switch is held on the product in an area of memory or firmware that cannot be overridden by an engineer upgrading the firmware on a product, such as a protected area within memory or firmware.

According to an example, a PCU uses the permissions granted, which are derived from data in the Permissions File received from the RHPC Unit 121, to control some or all of the features of the device it is incorporated within. The PCU's capability to control some or all of a devices features includes control over the supply of power to key components within the product, which will depend upon which type of PCU 103 it is and what product it is incorporated into.

PCU 103 Type 1 includes a gateway module built into the main firmware of the products middleware/firmware 101. In this configuration, the operating system of the product, before carrying out an instruction that will effect its operation, will interface with the PCU 103 at predetermined points and will only process the instruction once the PCU 103 grants permission to do so. This will typically be the main type of PCU 103 in use.

Type 2 connects to the RHPC Unit 121 either via a wired or wireless Internet connection, either via its own wired LAN or wireless WLAN controller; or by utilizing the LAN or WLAN built into the product itself, via a software interface with the products onboard middleware/firmware 101 for example.

The capabilities of PCU 103 Type 2 are such that it has some flexibility to fit into a number of devices. It also has the ability to plug in an Internet communication unit 113 or a GPRS or GPS Communication Unit. The communications modules can be interchangeable.

Control of the product is by various options on the PCU Type 2's interface board. Options include power switches capable of switching mains voltage and lower voltage levels. This type of PCU 103 can have an interface port that will enable the device to interface with the product it is installed within. Once interfaced the PCU 103 Type 2 can intercept instructions in the device's firmware/middleware 101 to limit the features of the device.

This type of unit can be used on products with long production runs, spanning many months or on products where the internal operating system and its hardware modules remain consistent from one product model to the next. It can be provided as a retrofit option and used to enhance the rental capabilities of end of line or refurbished products. Type 2 connects to the RHPC Unit 121 via the attached communication module.

The PCU 103 will, at predetermined intervals or on execution of certain events, connect to the RHPC Unit 121 to check for a new Permissions File. The PCU 103 will be configurable such that it can be forced to connect to the RHPC Unit 121 the first time it is switched on that day or every time it is switched on or when a certain event occurs such as a button is pressed or an instruction is carried out by the device's onboard operating system. It is also configurable such that it can be made to attempt a connection to the RHPC Unit 121 every X hours. It is possible to select multiple ways such as every 24 hours and every time the product is switched on for example.

In an example, how and when a PCU 103 connects to the RHPC Unit 121 is held in remotely configurable fields within a PCU's operating system. This enables load balancing of the connections to the RHPC Unit 121s and flexibility of choice of operation suitable to the circumstances under which the products are made available to the customer.

According to an example, a PCU 103 identifies itself with the RHPC Unit 121 and passes it the Permission Files Unique ID that it is currently in operation. If this is the same as the unique ID on the RHPC Units 121 current Permission File for that product then no action is taken. If not then the RHPC Unit 121 compiles the relevant Permissions for the customers' product and passes these back to the PCU 103 in the form of a Permission File. This could be in XML or some other suitable format, interface to a web service or data stream suitable for the capabilities of the Permission unit 109 in question. The operation of the product is not affected during this background checking process. Only when the new permissions are received and processed does the PCU 103 grant or deny the relevant permissions which can subsequently affect operation of the product. The PCU 103 saves the Permission File in internal memory for reference.

To prevent spoofing of the RHPC Units 121 IP address, the PCU 103 has security measures built in to ensure that the Permission unit 109 has received the file from a valid RHPC Units server. Using a combination of the Permission unit ID and another known number obtainable from either the product manufacturer's operating system/firmware that controls the product or a number obtained from a specific web service or IP address, the Permission unit 109 can calculate the Permission File Validation code and interrogate the Permission File to ensure that it contains the correct Permission File Validation code.

As added security the RHPC Unit 121 can remotely connect to the product at periodic or random intervals. Once connected the RHPC Unit 121 can interrogate the Permission File and the Permission File will be validated. If the incorrect Permission File is found the RHPC platform forces the correct Permission File onto the products Permission unit 109 and instructs the Permission unit 109 to adjust its permissions to match those in the new file. Once completed the RHPC Unit 121 raises a security exception with the Product Alert unit 111. In an example, the PCU 103 has a reboot function to enable it to recover from system glitches. The RHPC Unit 121 also has the ability to force it to reboot remotely.

The PCU 103 includes a Usage Log. The Usage Log monitors usage of the product and its features and is available to the RHPC Unit 121 to audit whether the PCU 103 has been operating as expected and provide other information that may be useful in providing services to the customer. Whenever changes are made to the PCU 103 it sends a message to a Product Alert unit 111 to confirm success or failure. The message also contains the new settings so that the RHPC Unit 121 can audit the changes.

On Internet enabled TVs and Set Top Boxes, tablet PCs, smart phones and other products equipped with the ability to connect to the Internet and display a graphical user interface on some sort of display for example, it may be desirable for the company that has provided the product to customise the look and feel of the product's user interface in line with their brand. To enable this approach, a PCU 103 can hold the default IP address that the TV's firmware will default to when connecting to the Internet. This is provided so that the company that has provided the rental product or sold it on a hire purchase or credit loan basis can customise the look and feel of the user interface by placing the user interface in the cloud for example.

This feature can also be used allow an organization or brand to take over the look and feel of the products user interface. It can also be used to allow the customer to select a brand or organizations user Interface from a selection of options that the Branding unit 127 makes available. This branding feature can operate in either 'Rental' or 'Retail' mode.

On some types of products the PCU 103 is able to give customers the option to make a payment on the product itself. TV's, Touch Screen Tablets and Touch Screen smart phones are examples of devices where the PCU 103 is able to do this but any product equipped with the ability to enter card details or fitted with a Near Field Communications device for example can offer the customer an option to make a payment and unrestrict the product. The PCU 103 is also able to accept payment from cards, smart phones, tablets or other devices equipped with some form of Near Field Communications device using any form of wireless technology. By interfacing securely to an online debit/credit card payment system the PCU 103 and RHPC Unit 21 are able to instantly handle payments.

As with the payments some devices have suitable input capabilities to allow a customer to enter a commitment date and payment amount. In such instances the PCU 103 can provide a customer with the option to make a commitment by selecting or entering a date, amount and how they will pay. The PCU 103 then contacts the RHPC Unit 121, the RHPC Unit 121 will review the customer account and decide what, if any restrictions can be lifted and it will updates an Arrears control unit 120 with the commitment and the Product control unit 125 will create a new Permission File and request the RHPC Unit 121 to send this to the PCU 103.

The PCU 103 has the ability to display web pages on any product that has the ability to display a web page and also capture user input on any product that provides a method of inputting data, whether it be using the product itself or a device whether wired or wirelessly connected to the product, using wireless routers, Bluetooth, Zigby or any form of wireless technology or internet protocol. Such devices could be a smart phone or a tablet PC. This means that the PCU 103 can send bulletins and get responses from customers.

According to an example, a further feature of the PCU 103 is the ability to have a Trace unit 105 to set a trace using location-based information. As a last line of defense the PCU 103 can also include a software 'deactivation instruction', whereby the RHPC Unit 121 can instruct the PCU Unit 103 to disable the device and make the Trace unit 105 begin tracking the device. The PCU 103 can also be programmed to disable the device itself if it has not been able to successfully connect to the RHPC Unit 121 for a configurable number of days. Both the RHPC Unit 121 and the PCU 103 can reverse the disabling of the device.

According to an example, products with a display can state which company the product belongs to and provide contact details for the person who has the product to contact. The PCU 103 also has the capability to be set to run in Proximity Mode. Here the company who has supplied the product can dictate under the contract terms the geographical area that the product can be operated in. At the point of install the Trace unit 105 can provide location data from where the product is delivered and where appropriate installed.

If set to run in Proximity Mode the PCU 103 will, each time the product is switched on and/or at configurable periodic intervals, send the RHPC Unit 121 the location data from the Trace unit 105. The RHPC Unit 121 will then send the data to the Proximity Unit, which will in turn validate the location is within the required proximity.

In some devices it is preferably to give the customer plenty of warning before a product is disabled. A fridge/freezer is an example of a product where it would be inappropriate to just switch off the product. In this instance the RHPC or PCU can activate a Countdown unit 110 and if the fridge/freezer has a display then a visual warning and count down can also be given. There are other products where a similar approach may be desirable. When combined with a product with a display device this feature can also be used as an electronic default notice; a default notice is required in some countries that regulate consumer finance before steps to recover the product or the outstanding debt are taken. Making the default notice electronic makes it easier, cheaper to issue and is environmentally friendly.

It is desirable in some circumstances to offer emergency credit so that the customer can use a product. If the customers' requests an emergency credit the PCU 103 checks with an Emergency credit unit 114 and if acceptable to do so in response to data received from the emergency credit unit 114, the PCU 103 can lift some or all of the restrictions in place for a limited time allowing the customer to contact the company that provided the product and make provisions to resolve a problem. In an example, the PCU 103 will not request emergency credits when the Deactivation instruction or Trace unit 105 has been activated.

The PCUs firmware can be upgraded, upon instruction by the RHPC Unit 121, using an Upgrade unit 107.

The PCU 103 may receive requests from the RHPC Unit 121 to display a bulletin asking the customer to approve a transfer of funds from a digital wallet for example. A secure webpage can be displayed with details of the transfer request and declining the transfer request or approving it in response to input of a pin number for example.

Product Alert Unit

According to an example, a Product Alert unit 111 can receive alerts from the main RHPC Unit 121 and the PCU 103 and sets of workflows according to the type of alerts received. The PCU 103, RHPC Unit 121 and Product Alert unit 111 are extendable to add new alerts. Types of alerts and their source include:

No Contact in 48 hours—RHPC Alert
No Contact in 72 hours—RHPC Alert
No Contact in 8 Days—RHPC Alert
No Contact in 15 Days—RHPC Alert
No Contact in 30 Days—RHPC Alert
No Contact in 60 Days—RHPC Alert
No Contact in 90+ Days—RHPC Alert
Permission File Mismatch—RHPC Alert
Failed to Connect to PCU—RHPC Alert
Trace Activated/Deactivated—RHPC and PCU Alert
Deactivation instruction Activated/Deactivated—RHPC and PCU Alert
Countdown Activated/Deactivated—RHPC and PCU Alert
Emergency Credit Top Up Requested/Granted—RHPC and PCU Alert
Permission Unit Auto Reboot—PCU Alert
Upgrade Success Alert—PCU Alert
Upgrade Failed Alert—PCU Alert
Permission File Mismatch—PCU Alert
New System Settings Alert—PCU Alert
Trace Log Sent—PCU Alert
Emergency Credit Approved/Declined—PCU Suitable workflows are executed in a back office CRM system based upon the alerts. These include but are not limited to booking of a service visit, sending an SMS, sending an Email and placing customer's details into a telephone autodialler for example. Typically, the Product Alert unit 111 straddles the RHPC and PCUs. That is, such a unit can be provided at either or both sides of the platform.

Arrears Control Unit

According to an example, an Arrears control unit 120 can manage the escalation process and recovery of arrears once the customer fails to meet their full contractual scheduled payments. The Arrears control unit 120 is fed future adjustments to the future payment schedule held in the Payment control unit 123 for each customer. These adjustments are based upon one or more commitments made by the customer.

The Arrears control unit 120 can build a future payment adjustment schedule for each of the periods for the rental contract and/or Hire Purchase agreement or credit loan. It builds this based upon information passed to it by from an external system such as a rental system or a financial loan management system. These systems interface with the Payment control unit 123 using a secure API and/or web services.

The adjustment schedule can be configured in multiple ways. It can be set up on a simple repeating cycle X monetary payment, on X day of the week or fortnightly period or X day of the month and be set to repeat for X payments. It can also be set to individual date and amount or multiple dates, each with a separate monetary amount.

The adjustment can be a positive or negative number and when applied to the payment schedule held in the Payment control unit 123 the Product control unit 125 can calculate whether the customer has met their payment commitment. This means that it is possible to accept a payment less than the contractual amount for a period of time as well as accepting higher payments to recover the arrears.

Workflows are executed in the back office system based upon the events on the payment date. SMS and Email reminders on the day the payment is due, failed commitment SMS's and Emails and other escalations events such as letters, passing details into an autodialler, arranging field arrears visits, raising repossession orders and passing customer details to external debt collection agencies can be provided. In an example, the Arrears control unit 120 sits within the RHPC Unit 121.

Payment Control Unit

According to an example, a Payment control unit 123 builds a future payment schedule for each of the periods for the rental contract and/or Hire Purchase agreement or credit loan. It builds this based upon information passed to it from an external system such as a rental system or a financial loan management system. These systems interface with the Payment control unit 123 using a secure API and/or web services.

If the customers repayments go up or down due to other transactions the Payment control unit 123 is updated to reflect the new future payment schedule. The Payment Control Module manages contractual payments.

The repayment schedule can be configured in multiple ways. It can be set to rental for X monetary payment, on X day of the week or fortnightly period or X day of the month and be set to repeat indefinitely. It can be set to X monetary value, over X weekly or fortnightly periods or X monthly periods. It can also be set to individual date and amount or multiple dates, each with a separate monetary amount.

Workflows can be executed in the back office system based upon the events on the payment date. SMS and Email reminders on the day the payment is due, failed commitment SMS's and Emails can be provided. In an example the Payment control unit 123 sits within the RHPC Unit 121.

Digital Purse Unit

According to an example, a Digital Purse Unit provides a means by which overpayments can be made against a customers account. These overpayments can be used in one of two ways. On a credit loan the overpayments can be used to make payments in advance. If the customers' payments stay in advance then the funds can be used to repay the loan early and reduce the interest payable to the company providing the finance can use the digital purse.

The other way in which the customer may use the digital purse is to pay extra against the product they are renting or buying so that they can use these funds to purchase extra services from the company they are renting or purchasing from, or third parties introduced by the company. These additional services could include, but are not restricted to:

Purchasing of Video on Demand on a product capable of playing video.
Purchasing of Apps on an IPTV, smart phone, tablet PC or computer.
Purchasing of music downloads.
Purchasing or subscribing to TV channels or packages of TV channels.
Pay Per View programs.
Subscriptions to receive content from publishers.
Transfer of funds to an online savings account.
Repayments of other loans.
Payment for extended services from third parties introduced by the rental of credit loan company.

The Digital Purse Unit makes a secure API available for third parties to access the funds available. In an example, a customer can authorize any request for funds. When the Digital Purse Unit receives a request for funds through the API it sends an instruction to the RHPC Unit 121 to seek permission from the customer.

The RHPC Unit 121 will establish the best way to gain permission from the customer. This could be by sending a request for the PCU 103 on one or more of the products that the customer owns, which in turn will display a secure Fund Transfer Approval webpage for the customer to enter their pin number into. It may be by sending an SMS text to the customers mobile on record and asking them to respond with approval or give them a code to enter into an approval webpage. It could be an email with a link to the secure Fund Transfer Approval webpage. The Digital Purse Unit can sit within the Payment control unit 123.

Product Control Unit

According to an example, a Product control unit 125 interfaces to the RHPC, Product Alert unit 111, Arrears and Payment Control Units.

When connecting to the Payment and Arrears Controls Units the Product control unit 125 constantly monitors the schedule of payment commitments for each unique product that each customer has. These payment commitments can range from a number of weeks or months at a certain monetary value to specific installments, for a specific monetary amount on specific days of the month, days of the week or a single date. They could also multiple single dates and multiple repayment amounts.

Based upon the outcome of these payment commitments the Product control unit 125 builds a new Permissions File for each customer and deposits this with the RHPC Unit 121, along with change order which is set to 'Immediate' to force the RHPC to force the PCU 103 to action changes in Permission File straight away; or it will set it to 'On Check In' and the RHPC will wait until the next schedule connection from the PCU 103. The Product control unit 125 can sit within the RHPC Unit 121.

The Product control unit 125 is able to handle situations where customers have one or more products from the company that have been registered on the RHPC Unit 121. It is programmed to be able form a holistic view of a customer's repayments and create separate Permission Files for one or more products that they may have.

Upgrade Unit

According to an example, an RHPC Unit 121 can remotely upgrade the Permissions Control Units operating system to a new version of the operating system. This Upgrade Process takes place as a background task whilst the product is switched on. The Upgrade Process will have safeguards such that it will be able to resume download of the new operating system if the products power is interrupted or the Internet Connection is lost. It is not be possible for the PCU 103 to cease working due to a failed upgrade, checksums will be embedded in the new operating file that is downloaded to ensure integrity and a fallback solution is available to revert the back to the PCUs last known good state. The PCU 103 or the RHPC can request this fall back at any time.

Whilst upgrading, the PCU 103 monitors the time taken to download the operating system and complete the upgrade. Upon successful completion an Upgrade Success Alert is sent to the Product Alert unit 111. If it is outside of the normal tolerances for completion of the task the PCU 103 can send an Failed Upgrade alert to the Product Alert unit 111, and connect to the RHPC Unit 121 to request a new download of the replacement operating system and attempt again. If successful then the PCU 103 sends an Upgrade Success alert to the Product Alert unit 111. The Upgrade unit 107 can be provided within a PCU 103.

Internet Communication Unit

According to an example, two types of Internet communication unit 113 can be provided—one that utilises the onboard Internet connection available on the product itself and one that adds a LAN and/or WLAN capability for the PCU 103 to connect to the RHPC Unit 121. The LAN and WLAN units are configurable via instructions sent from the RHPC Unit 121. An Internet communication unit 113 can connect to the PCU 103

GPRS or GPS Communication Unit

According to an example, a modem can be provided that enables the PCU 103 to connect to the RHCP Unit via a mobile network. The GPRS or GPS Communication Units can connect to the PCU 103

EPG/Menu Unit

An Electronic Program Guide (EPG) is typically available for IPTVs. Other products may have an onboard menu system or user interface to select features or programs. In an example, an EPG/Menu unit 115 enables the PCU 103 to point the product it is operating on to the EPG/Menu unit 115 that the company that provided the product wishes to use. The RHPC Unit 121 or the PCU 103 can both control program options that the customer can or cannot see on the EPG, menu or user interface.

On an IPTV utilizing a cloud based EPG this means that the channels can also be enhanced with Internet streamed channels that can also be restricted by the PCU 103. A Cloud EPG/Menu unit 115 can retrieve its program guide data from either the DTT signal feeding the TV that the PCU 103 is controlling or the Internet. It can also extend the information available on programs, actors, etc from data available on the Internet. The cloud based EPG or EPG/Menu unit 115 can be branded through the Branding unit 127 as desired. The PCU 103 can control both a device's onboard EPG or another product's onboard menu equivalent as well as a cloud based EPG or cloud based menu system for a non-TV product. The EPG/Menu unit 115 can be provided within the RHPC Unit 121 and can interface with the Branding unit 127. Such a unit can thus be provided at either or both sides of the platform.

Whether the device or product holds its EPG, menu or user interface onboard the device, in the cloud or in both, the RHPC unit 121 and PCU 103 are able to control what selections, options, menus, screens etc are available to the customer.

Branding Unit

According to an example, a branding unit 127 can store data representing details of the user interface that the supplier of the product wishes to use. It can associate a PCU's unique ID to a particular IP address for the brand in question. The supplier of the product can choose to license the user interfaces look and feel to other companies or brands for prescribed periods of time and so provision are made for this by being able to associate more than one user interface IP address to any particular product.

Other commercial arrangements are possible. For instance the company running the RHPC system may choose to retain ownership of the user interface and create a revenue stream by making the look and feel of the user interface available to other companies and brands and in return give the provider of the product a share of revenues. The Branding unit 127 can be provided within the RHPC Unit 121 and can interface with the Cloud EPG or Menu unit 115.

Trace Unit

Both the RHPC and PCU 103 can switch on the trace mode at any time. A Trace unit 105 according to an example can then take any location-based information available to it. In the case of a Type 1 unit this will come from the product in question or if it is Type 2 then it will come from Internet, GPRS or GPS Communication Units for example. The location data can include, but is not restricted to, IP addresses of Internet connections, wireless hotspots and GPRS or GPS location data.

The Trace unit 105 attempts to transmit location data to the RHPC Unit 121 via the products Internet connection when it is available. In an example, when the Internet connection is not available the Trace unit 105 saves location data on to the products onboard memory and transmits the data as soon as it is able to connect to the Internet.

The trace unit 105 has an option to operate undetected from a person who may have stolen the product or overtly by displaying a message on products that have the capability to display a message.

When first installing the product, a company that is renting the product or providing the product on some form of hire purchase or loan agreement and which has rights over the product under the contract, can choose to capture the location data at the point of install so that they are able to validate that the products are still at the location dictated by the terms of the contract with the customer. It is also possible to operate the product in proximity mode. In this mode the product will only operate when in a predetermined proximity to the place where it was set up and installed, or another desired location. The Trace unit 105 can be provided within the PCU 103.

Countdown Unit

According to an example, a Countdown unit 110 provides the PCU 103 with the ability to sound audible warnings to warn the customer that the product will be deactivated, in X days. If the product has a display then the warning can be displayed in a visual form. The PCU 103 can disable the Countdown unit 110 once the RHPC Unit 121 sends a Permission File with an instruction to cancel the countdown.

It the PCU 103 sets off the Countdown unit 110 itself because it was unable to connect to the RHPC Unit 121 then the PCU 103 can disable the Countdown unit 110 as soon as contact is made with the RHPC Unit 121 and the latest Permission File is received. Once the Countdown unit 110 reaches the end of its countdown the PCU 103 activates the Deactivation instruction and Trace unit 105. The Countdown unit 110 can be provided within the PCU 103.

For additional safety the Countdown unit 110 can be configured such that it will only reach zero upon a certain event occurring on the product or device. A fork lift truck for example would only deactivate after the ignition was turned off.

Emergency Credit Unit

According to an example, an Emergency credit unit 114 contains a set of rules and a counter of Emergency Credits available to the customer. Each time an Emergency Credit is requested the counter is subtracted. When it gets to zero the Emergency credit unit 114 ceases to give the PCU 103 permission to provide emergency credit to the customer.

The Emergency credit unit 114 can request to reset the counter when it gets to zero. It does this by connecting to the RHPC Unit 121 over a secure encrypted connection using multiple varying passwords and validation methods to make sure that it has connected to the correct RHPC Unit 121 and not a spoof server. The Emergency credit unit 114 can be provided within the PCU 103.

Permission File

According to an example, a Permission File includes data representing an extendable instruction set which future proofs the PCU 103 and makes it possible to implement the entire system on any type of electrical, electronic product or powered equipment in the market today or at any time in the future.

The data and instructions it contains will vary from product to product based upon the type of features that the PCU 103 will be able to disable on the product in question. Each Permission File has a unique Permission File Validation code designed to help authenticate the validity of the Permission File. The Permission File also contains some information in respect of the customer so that the PCU 103 can display this information on products equipped with some form of display. For instance, a unique customer reference number and the customers name can be available in the file for the PCU 103 to display. Product payment information can also be available so that a PCU 103 can display the next payment date and payment amount, the current arrears and a statement of payments made, without having to fetch this information from the RHPC Unit 121.

In an example, a Permission File Validation code can take the unique product ID of the product at the time of install such as the MAC address or other unique product number and the both the RHPC and the PCU 103 can perform date based transformations on this number to determine what the validation code should be thereby allowing the RHPC to generate and code and the PCU 103 to confirm that it is a valid file. The algorithms stored in the PCU 103 can be changed by the RHPC at any time to guard against internal theft and circulation of the secret algorithms.

In an example, an asymmetric key algorithm can be used to verify that a Permission File is valid. Accordingly a pair of cryptographic keys is provided for a device and the RHPC. Data representing a Permission File can be hashed and encrypted using a private key associated with the device. Decrypting using a public key can occur at the RHPC to verify that the Permission File has not been tampered with in transit. In an alternative mechanism, a file can be 'digitally signed' at the RHPC and verified within a PCU 103 for example.

The Permission File also contains contact details to display when the device has had the Deactivation instruction activated or the overt trace feature switched on. In an example, a Permissions File can be created in any format that is suitable for the product that the PCU 103 resides in. It could be XML or some other file format, be it a standard format or a propriety one, it could be in the form of a data stream or for products where the Permission Control is unable to save the Permission File actually on the products memory it could be held in the cloud and accessed via a web service or some other interface. The Permissions File can be sent using and Internet connection or it can be contained in an SMS for example. The Permission File straddles the PCU 103 and RHPC Unit 121.

Example Device—Internet Enabled Television (IPTV)

PCU 103 Type 1 can be added to the middleware/firmware 101 of the TV controller board. The TV controller board handles both TV signals and Internet signals. It will only be installed to Internet enabled TVs.

The TV's control board middleware/firmware 101 interfaces with the PCU 103 to check what channels it can display on its Electronic Program Guide (EPG) and what functions on the TV can be used. The functions that can be restricted include:

1 or more channels on the EPG
   1 or more Widgets or Apps on the TV
   1 or more of the Video on Demand service available on the TV
   1 or more of the Catch Up TV services on the TV
   1 or more any types of audio input
   1 or more video input ports including but not limited to HDMI, SCART, AV, Composite, S-Video, RGB, DVI, DVA
   LAN Connector
   WLAN Module
   LCD, LED, OLED or any type of display module
   Any PVR recording device either directly connected to the TV or held on a remote server in the Internet cloud.
   Camera's fitted to the TV
   Motion or voice control features As the system is upgradeable, new features that will be introduced in the future can also be controlled in this way.

The PCU 103 has sufficient control to prevent the TV being able to display video/moving images or still images that are passed to the TVs display panel, either through an input port of some description or, as is becoming more popular, are transmitted wirelessly to the TV. For example, the PCU 103 has the ability to instruct the TV's onboard firmware to switch off all external ports that can be used to feed video signals to the TVs display. This stops the input at a hardware level. It can also prevent the TVs source button from switching from one input port to another and therefore ignoring remote control instructions or the source button selection buttons on the product itself.

This capability is designed to prevent the TV being used as a monitor display by plugging in an external video input or wirelessly transmitting a video/moving images or still images in order to bypass the restrictions. Similarly the PCU 103 is able to prevent the TV from playing or transmitting audio signals by disabling both the onboard speakers and external sound outputs that can be fed into an external amplifier for example, so that the ability for the TV to provide audio to the viewer is completely controlled by the PCU 103. In an example, the PCU 103 is able to intercept and prevent the main display panel from displaying. The PCU 103 can either control what channels are available from the onboard EPG or it can disable the onboard EPG and use a Cloud EPG unit 115 integrated to the RHPC Unit 121. If the TV uses a cloud based EPG as default then the PCU 103 is also be able to control what does and does not appear on the EPG menu list.

Scenario 1:

A customer pays each scheduled payment on time. The PCU 103 confirms that the payment has been made and it creates a new Permission File and sends this to the RHPC.

The PCU 103 connects, as per its programmed connection settings, to the RHPC to check if the Permission File is available. The PCU 103 reads the file and saves the data onto the TV. The PCU 103 checks for changes to the required permissions and processes any changes.

In this example no restrictions are carried out because the customer has made their payments as contracted to do so.

Scenario 2:

A customer misses a scheduled payment or the customers' bank, credit or debit card company cancels a payment that they have made.

The Product control unit 125 checks for the payment and when it sees that the payment is missing or has been cancelled it builds a new Permission File and sends this to the RHPC Unit 121 along with an instruction to send the new Permission File immediately.

The RHPC Unit 121 attempts to connect to the PCU 103 for the product in question. If a connection cannot be made to the PCU 103 within the product in question then the RHPC will retry periodically until it succeeds or the PCU 103 checks in by itself.

The PCU 103 receives the Permission File and processes the instructions. In this scenario because the customer has not paid their payment the TV Channels available to customer are restricted and the ability to display video/moving images and still images from another source can be disabled.

When the customer switches on the TV the PCU 103 can force an Important Bulletin window to be displayed on screen overlaid above the TVs image. The customer cannot remove this window from the display.

The Important Bulletin window can display a Bulletin webpage that asks the customer to enter an identification pin code before being shown a Late Payment message. From this page the customer can elect to make a payment, check their payment details are correct and change if necessary or make a commitment to pay at a later date.

If they choose to make a payment they are taken to a Make Payment webpage and have the choice of making a card payment or by waving or touching a card or device equipped with some form of wireless Near Field Communication payment method. If they choose to pay by the latter, a Wave Payment Device webpage can be displayed.

If they choose to make a card payment then a secure Card Payment webpage can be displayed within the webpage. If the customers payment details are held by the online debit/credit card processing system then the customer is presented with the last few digits of the card numbers on file in order to select the card they wish to use, alternatively they enter the card details using their remote control or smart phone/tablet computer that may be linked to the TV and capable as acting as a remote control/input device.

The PCU 103 and the RHPC Unit 121 co-ordinate and ensure that the debit/credit card system receives the appropriate customer and payment data for processing the payment. If the payment is unsuccessful the PCU 103 will display the Failed Payment webpage with an option for the customer to return to Late Payment web page where they can attempt to make a payment by another means or make a commitment to pay at a later date.

If the payment is successful the Payment Success webpage is displayed along with a message informing the customer that the system is updating its records and to be patient.

The Payment control unit 123 receives details of the payment. The Product control unit 125 picks up these details and checks if the payment is enough to clear all or just part of the arrears. If the payment covers all the arrears then the Product control unit 125 creates a new Permission File with all the restrictions lifted. If the payment does not cover all the arrears then the Product control unit 125 will create a new Permission File with appropriate restrictions based upon the severity of the arrears and the length of time that the customer has been in arrears.

The Permission File is sent to the RHPC Unit 121 along with an instruction to send it immediately to the PCU 103. Once the PCU 103 receives the new Permission File it validates and processes the new set of permission instructions and displays the Payment Thank You webpage, which finally gives the customer the option to close the Bulletin window and continue uninterrupted viewing of the terrestrial or internet channels that the Product control unit 125 has given permission, for the PCU 103, to make available on the TVs EPG. As well as allowing access to some or all of the Apps, Widgets or other Internet services that the IPTV is capable of delivering.

Scenario 3:

This scenario is similar to scenario 2 but this time when the Late Payment webpage is displayed the customer selects the option to make a commitment to pay at a later date.

A Commitment Webpage can be displayed and the customer is given the option to select a date that they will pay by, the amount that they will pay and the method they will pay with.

The customer can also choose to repay the arrears over several payments on a repeating, weekly, fortnightly or monthly cycle. The customer also has the option of selecting specific dates and repayment amounts.

The Arrears control unit 120 will govern how long the customer can take to repay the arrears and the minimum extra payment the customer must make based upon rules provided by the company that provided the product to the customer.

Once the customer has confirmed their commitment the Processing Commitment webpage is displayed whilst the Product control unit 125 picks up the commitment from the Arrears control unit 120, builds an appropriate Permission File with suitable restrictions based upon severity of the arrears and time being taken to repay the arrears. The Permission File is sent to the RHPC Unit 121 with the instruction to send it immediately to the PCU 103.

The PCU 103 picks up the Permission File, processes the instructions and then displays the Commitment Accepted webpage. Once here the customer can now close the Bulletin window and resume watching from the available terrestrial or Internet channels available as well having use of some or all of the Apps, Widgets or other Internet services that the IPTV is capable of delivering.

Scenario 4:

In this scenario the customer makes no attempt to pay and avoids all contact.

When the TV is switched on the Bulletin window opens requesting the customers pin number and preventing the customer from being able to watch the TV.

Scenario 5:

If the instruction to activate the Deactivation instruction or start an overt trace is received by the PCU 103 the TV is disabled and the PCU 103 displays the contacts details held within the Permission File and asks the person switching on the product to make contact. The person with the product has not ability to use the product when it is in this mode.

The scenarios here deal with a PCU 103 in Type 1 configuration; that is, a PCU 103 that is incorporated into the firmware/middleware of the product in question.

This type of PCU 103 is designed to be totally flexible and can be configured such that it can work in any electronic, electrical or powered product where access to the features of the product can be controlled such that the customer will have to continue to make payments for the product to enjoy the full range of features that the product offers.

Similar approaches can be taken to control payments on Smart Phones, Tablet PCs or any computer device be it a desk based system or a mobile computer or any of the other electrical, electronic product or powered equipment.

In its simplest guise the PCU 103, be-it of Type 1 or Type 2 or another type as described above can control the power supply to key components within the product, thus rendering the component inoperable.

In its more complex guise it can be embedded at the products firmware/middleware level or if it is of a Type 2 configuration for example it can override the standard firmware/middleware found inside the product.

Where the PCU 103 is installed on a product with no display or input device the customer is able to click on a link in an email or go directly to the website that hosts there online account. Once logged in they can make payments, commitments and arrange service calls etc as they can on a product with input and display capabilities.

Figure 2:
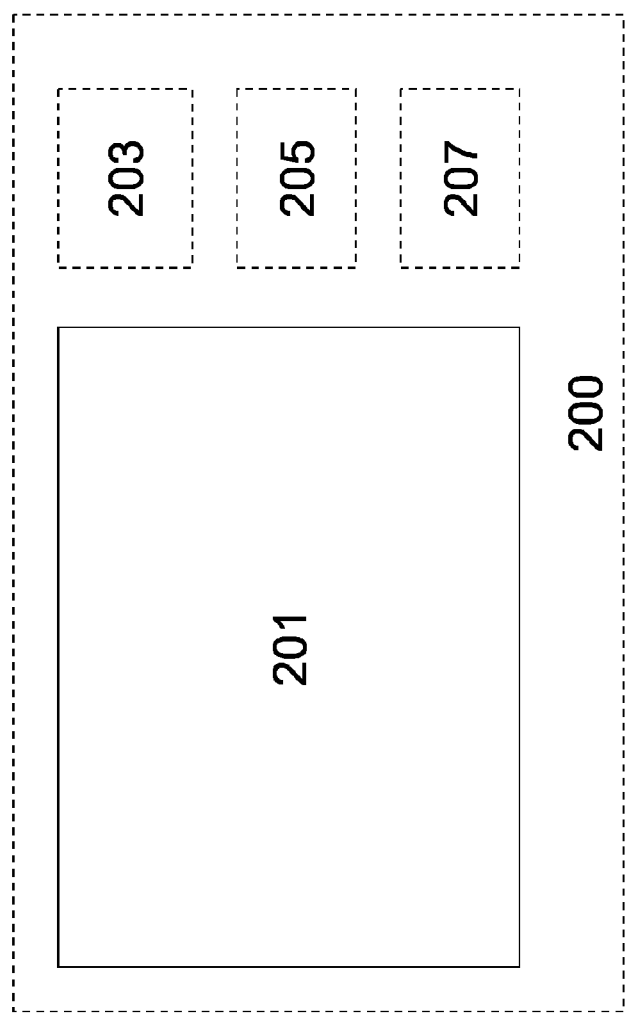
FIG. 2 is a schematic block diagram of a device according to an example.

FIG. 2 is a schematic block diagram of a device 200 according to an example. Device 200 includes a display 201 for the display of still or moving images for a user for example. Device 200 can be any device as mentioned previously, including but not limited to an internet enabled television, a 'white goods' product such as a refrigerator, freezer or washing machine and so on, a mobile device such as a mobile telephone, computing apparatus or tablet device for example. Alternatively, device 200 can be any consumer product which can be provided to a consumer on a rental basis, such as a vehicle for example.

Device 200 can include a PCU 203 which can be in the form of the one of the PCU types described above. Device 200 can include a communications unit 205 which enables the device to communicate with a remote device such as a server via the internet or via any wired or wireless communications network such as GPRS or the like, or a short range radio-frequency protocol.

Accordingly, device 200 can utilize a cloud based PCU instead of having one installed locally. A local PCU may be provided in addition in case of connectivity issues for example. A local PCU 203 may be provided as part of the firmware/middleware 207 of the device 200.

Figure 3:
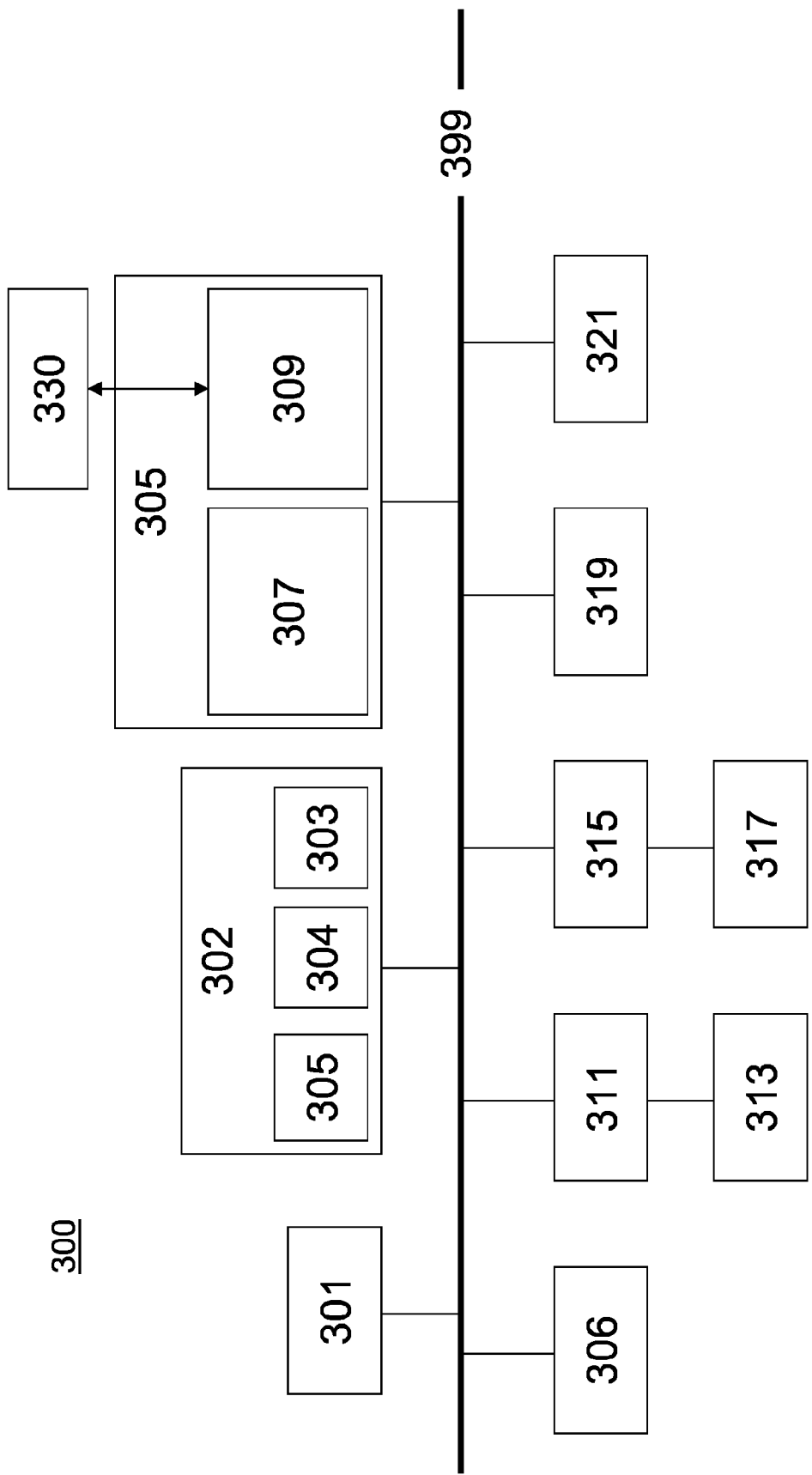
FIG. 3 is a schematic block diagram of a system according to an example.

FIG. 3 is a schematic block diagram of a system according to an example suitable for implementing any of the methods or processes described above. Apparatus 300 includes one or more processors, such as processor 301, providing an execution platform for executing machine readable instructions such as software. Commands and data from the processor 301 are communicated over a communication bus 399. The system 300 also includes a main memory 302, such as a Random Access Memory (RAM), where machine readable instructions may reside during runtime, and a secondary memory 305. The secondary memory 305 includes, for example, a hard disk drive 307 and/or a removable storage drive 330, representing a floppy diskette drive, a magnetic tape drive, a compact disk drive, etc., or a nonvolatile memory where a copy of the machine readable instructions or software may be stored. The secondary memory 305 may also include ROM (read only memory), EPROM (erasable, programmable ROM), EEPROM (electrically erasable, programmable ROM). In addition to software, data for a PCU 103, 203 may be stored in the main memory 302 and/or the secondary memory 305. A PCU may be provided as hardware 306 communicatively coupled to the rest of the system 300. For example, PCU 306 can be a logic circuit, or can be part of a middleware or firmware logic circuit for example. The removable storage drive 330 reads from and/or writes to a removable storage unit 309 in a well-known manner.

A user can interface with the system 300 with one or more input devices 311, such as a keyboard, a mouse, a stylus, a touch screen, and the like in order to provide user input data and to provide input relating to the editing of a summary or set of summaries for example. The display adaptor 315 interfaces with the communication bus 399 and the display 317 and receives display data from the processor 301 and converts the display data into display commands for the display 317. A network interface 319 is provided for communicating with other systems and devices via a network (not shown). The system can include a wireless interface 321 for communicating with wireless devices in the wireless community.

It will be apparent to one of ordinary skill in the art that one or more of the components of the system 300 may not be included and/or other components may be added as is known in the art. The apparatus 300 shown in FIG. 3 is provided as an example of a possible platform that may be used, and other types of platforms may be used as is known in the art. One or more of the steps described above may be implemented as instructions embedded on a computer readable medium and executed on the system 300. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

What is claimed is:

1. A computer-implemented control method for a rented device, comprising:
   providing identification data to identify the rented device at a server;
   receiving a permission data file for the rented device from the server on the basis of the identification data, and including data representing a set of operating permissions associated with the device;
   validating the permission data file; and
   executing a device specific operation on the basis of the permission data file to control use of a function of the rented device by preventing access to that function, by enabling full access to that function, or by allowing limited access to that function.

2. A computer-implemented control method as claimed in claim 1, the device operable to display static and moving images, further including controlling an electronic program guide for the device.

3. A control system for a rented device, the system comprising:
   a control platform unit operable to provide permission data representing multiple operating permissions associated with such a device; and
   a permission control unit of the rented device operable to receive permission data from the control platform unit, and to use such received permission data to control use of a function of the rented device by preventing access to that function, by enabling full access to that function, or by allowing limited access to that function.

4. A control system as claimed in claim 3, wherein the permission control unit is a standalone unit for connection to such a rented device and is further operable to restrict a function of such a rented device upon removal of the permission control unit from the rented device concerned.

5. A control system as claimed in claim 3, wherein the permission control unit is embedded into a firmware module of such a rented device to be controlled.

6. A control system as claimed in claim 3, wherein the permission control unit is a cloud based module operable to communicate with the device.

* * * * *